O. L. ANDERSON.
VEHICLE FENDER.
APPLICATION FILED MAR. 30, 1914.

1,132,546.

Patented Mar. 23, 1915.

WITNESSES:
Anna M. Dow
Chas. W. Stauffiger

INVENTOR
Oscar L. Anderson
BY
ATTORNEYS.

UNITED STATES PATENT OFFICE.

OSCAR L. ANDERSON, OF FLINT, MICHIGAN.

VEHICLE-FENDER.

1,132,546.  Specification of Letters Patent.  Patented Mar. 23, 1915.

Application filed March 30, 1914. Serial No. 828,171.

*To all whom it may concern:*

Be it known that I, OSCAR L. ANDERSON, a citizen of the United States of America, residing at Flint, in the county of Genesee and State of Michigan, have invented certain new and useful Improvements in Vehicle-Fenders, of which the following is a specification, reference being had therein to the accompanying drawings.

This invention relates to fenders or mud guards for wheeled vehicles and more particularly to a sheet metal construction especially adapted for motor vehicles.

The object of the invention is to construct a sheet metal fender having great strength and rigidity which is cheap to manufacture and not subject to disintegration due to the opening of seams or formation of rust therein and which has no parts liable to become loose and to rattle.

With these and other ends in view the invention consists in forming a fender body from a single sheet of metal with a depending reinforced flange, and further in providing certain other new and useful features in the construction, all as hereinafter more fully described reference being had to the accompanying drawing in which—

Figure 1:
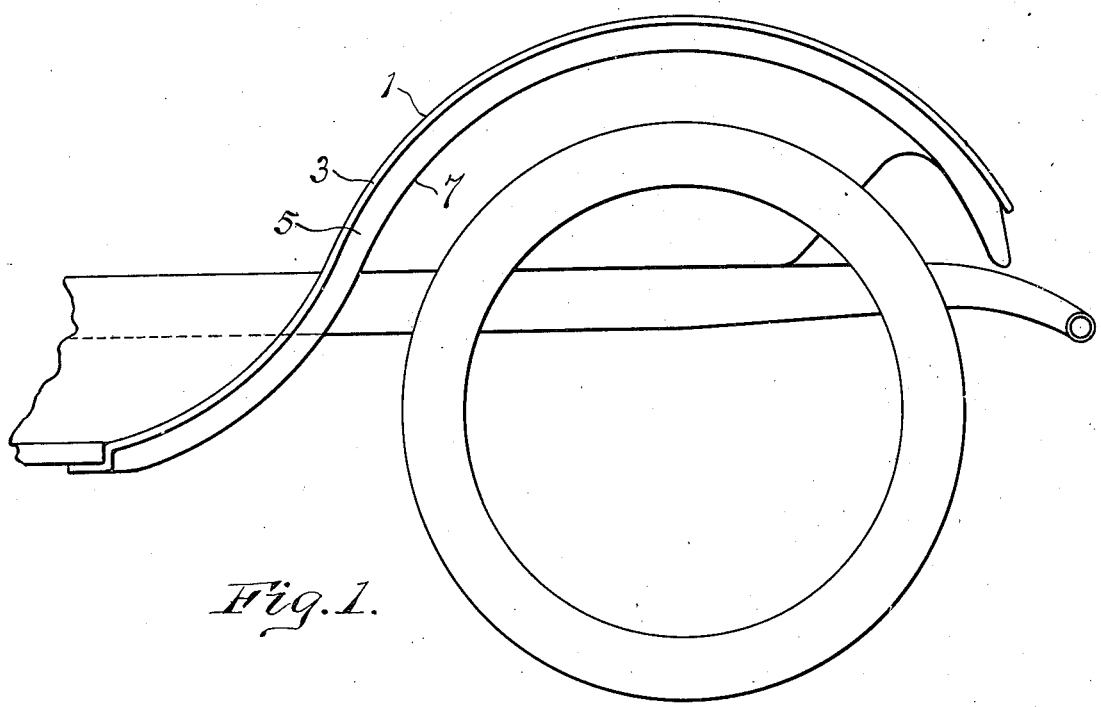
Figures 2, 3:
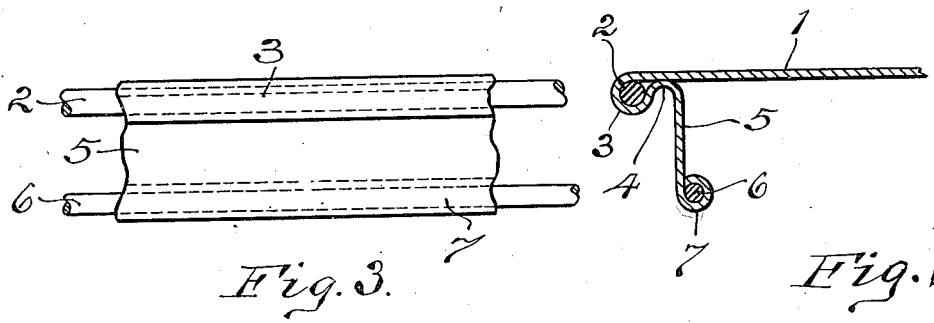

Figure 1 is a view illustrating in side elevation, a fender embodying the invention, in place upon a vehicle; Fig. 2 is a cross sectional detail of a fender; and Fig. 3 is a detail showing an edge elevation of a portion of the same.

For convenience of illustration a fender of the usual configuration for use upon motor vehicles is shown in position upon an automobile frame, but it will be understood that a fender embodying this invention may be made in any desired shape to conform to the requirement of the particular vehicle to which it is to be attached.

To cheapen the construction and facilitate the manufacture, the fender is formed from a single sheet of metal bent into the desired form with an integral edge flange to give strength and rigidity which flange is reinforced to further stiffen the construction. A marginal portion of the body 1 is bent downwardly and around a stiffening wire 2, thus forming an edge bead 3 along the body, which bead lies wholly below the horizontal plane of the upper surface of the body. The marginal portion is carried upwardly at the inner side of the wire 2 into contact with the lower surface of the body and thence extended inward a short distance as at 4 to space the depending flange 5 which is formed by extending the metal downward at right angles to the lower surface of the body, from the edge bead 3. The metal along the lower edge of the flange 5 is bent inwardly and around a strengthening wire 6 to form a strengthening edge or bead 7 on the flange.

In thus forming the fender body from a single piece of sheet metal, a fender is provided which has no seams liable to open up in use and into which moisture may penetrate and rust the metal, thus causing quick disintegration. There are no separate parts in a fender of this construction to become loosened in use and rattle. By carrying the marginal portion of the metal into contact with the lower surface of the body at the inner side of the wire 3, the depending flange 5 may be firmly brazed or otherwise secured to the body and said flange is spaced from the bead 3 to give the desired overhang. This contact of the marginal portion of the metal with the lower surface of the body at the inner side of the edge bead 3 also includes moisture from the loop embracing the wire 2 and thus prevents the rusting of the metal.

Having thus fully described my invention what I claim is:—

A fender body for vehicles formed from a single sheet of metal having a margin thereof downwardly rolled around a stiffening wire to form a single ply edge bead with the horizontal plane of the wire lying wholly below the horizontal plane of the body and said marginal portion formed into contact with the body at the inner side of said bead and then extended downward in a vertical plane to form a depending single ply flange and inwardly rolled around a strengthening wire along its edge and terminating at the inner side of said flange.

In testimony whereof I affix my signature in presence of two witnesses.

OSCAR L. ANDERSON.

Witnesses:
LEWIS E. FLANDERS,
ANNA M. DORR.